US008396453B2

(12) United States Patent
Snow et al.

(10) Patent No.: US 8,396,453 B2
(45) Date of Patent: Mar. 12, 2013

(54) METHOD AND APPARATUS FOR SURREPTITIOUSLY TRIGGERING THE COLLECTION OF DATA FROM A LOST WIRELESS COMMUNICATIONS DEVICE EQUIPPED WITH AUDIO AND/OR VIDEO COLLECTION MEANS

(75) Inventors: Benjamin Snow, Deerfield Beach, FL (US); William S. Eichenberger, Parkland, FL (US); Von A. Mock, Boynton Beach, FL (US); Wayne W. Ballantyne, Coconut Creek, FL (US)

(73) Assignee: Motorola Mobility LLC, Libertyville, IL (US)

( * ) Notice: Subject to any disclaimer, the term of this patent is extended or adjusted under 35 U.S.C. 154(b) by 923 days.

(21) Appl. No.: 11/687,248

(22) Filed: Mar. 16, 2007

(65) Prior Publication Data

US 2008/0132245 A1 Jun. 5, 2008

Related U.S. Application Data

(60) Provisional application No. 60/867,966, filed on Nov. 30, 2006.

(51) Int. Cl.
*H04M 1/66* (2006.01)
*H04M 1/68* (2006.01)
*H04M 1/16* (2006.01)

(52) U.S. Cl. ............... 455/411; 455/404.2; 455/410; 455/419; 455/420; 455/456.1; 340/6.11; 340/7.58

(58) Field of Classification Search .............. 455/410, 455/436, 404.2, 456.1
See application file for complete search history.

(56) References Cited

U.S. PATENT DOCUMENTS

| 2001/0018339 | A1* | 8/2001 | Murakami .................. 455/411 |
| 2001/0032236 | A1 | 10/2001 | Lin |
| 2004/0070499 | A1* | 4/2004 | Sawinski .................. 340/568.1 |
| 2004/0192256 | A1* | 9/2004 | Kuwajima .................. 455/411 |
| 2004/0255081 | A1* | 12/2004 | Arnouse .................... 711/115 |
| 2005/0046580 | A1* | 3/2005 | Miranda-Knapp et al. ............. 340/686.1 |
| 2005/0197125 | A1* | 9/2005 | Kang et al. ................ 455/439 |
| 2005/0245232 | A1* | 11/2005 | Jakober et al. ............ 455/410 |
| 2006/0111143 | A1 | 5/2006 | Pande et al. |

* cited by examiner

Primary Examiner — Anthony Addy
Assistant Examiner — Quan M Hua
(74) Attorney, Agent, or Firm — Stephen H. Shaw

(57) ABSTRACT

A method for locating a wireless communications device WCD (102). The method includes the step of receiving at the WCD (102) a wireless transmission comprising a first auto-location trigger signal. The WCD (102), responsive to the first auto-location trigger signal, operates in an auto-location mode. The auto-location mode includes the automatic collection and communication of predetermined first data, such as audio, video, and GPS location data. After the automatic collection and communication step of the first data is complete, the WCD (102) enters into a standby mode. The standby mode continues until a state detection device (206) of the WCD (102) detects a change in the state of the WCD (102). These changes in state are exclusive of the wireless transmission comprising the first auto-location trigger signal. The change(s) in state produce a second auto-location trigger signal, which causes the automatic collection and communication of a second data that is the same or similar to the first data.

13 Claims, 4 Drawing Sheets

METHOD AND APPARATUS FOR SURREPTITIOUSLY TRIGGERING THE COLLECTION OF DATA FROM A LOST WIRELESS COMMUNICATIONS DEVICE EQUIPPED WITH AUDIO AND/OR VIDEO COLLECTION MEANS

CROSS REFERENCE TO RELATED APPLICATIONS

This application claims the benefit of priority to U.S. provisional patent application Ser. No. 60/867,966 filed on Nov. 30, 2006, which is incorporated by reference as if fully rewritten herein.

BACKGROUND OF THE INVENTION

1. Field of the Invention

The present invention generally relates to systems and/or methods for tracking wireless communication devices (WCDs). More particularly, the invention relates to a system and/or method of triggering the surreptitious collection of audio and video data transmitted from a lost wireless communication device.

2. Background of the Invention

There is a present need for countering the theft or accidental loss of wireless communications devices, such as cellular phones, wireless notebook computers, and personal digital assistants. In this regard, several methods have been proposed.

One proposed solution involves restricting the use of the lost/stolen WCD. U.S. Patent Application Publication 2004/0192256 to Kuwajima teaches a mobile terminal (such as a cellular phone) containing a personal authentication function. The personal authentication function utilizes facial and other biometric data to check for the authenticity of the inputted identity information. The mobile terminal includes an identity information inputting section. The identity information inputting section can include a camera that picks up the facial image of the current user of the mobile terminal. The facial image of the current user is then cross-checked to see whether it matches the facial image of an authorized user. A positive authentication is required for the operation of the mobile terminal. The results of the authentication check are transmitted to a communication base station. In this case, however, the current users of the mobile terminal are aware that their facial images are being recorded.

Other proposed solutions focus on locating the lost/stolen device. For example, U.S. Patent Application Publication 2001/0032236 to Lin teaches a method and portable system for multi-tracking among independent individuals without a monitoring center. Each individual carries a positioning unit which forms part of a network of positioning units for searching and tracking one another. Each positioning unit can provide GPS (Global Positioning System) tracking data and audio data to the other positioning units of the network. While this method effectively employs GPS signal, video, and audio data in tracking a particular unit(s), it does not address how and when the collection of such data is to be initiated.

Similarly, U.S. Patent Application Publication 2006/0111143 to Pande et al. teaches a method and system for sending location data using the GPS and imaging features of a wireless device (i.e. cellular phone) forming part of a wireless network. Using the video camera features installed in many wireless devices, the wireless device, upon remote activation, sends video images of the phone's surroundings to a remote location within the wireless network. In addition, the video image data is tagged with user position GPS data to assist in the recovery of the wireless device and/or user of the wireless device.

When a lost/stolen phone's camera and microphone are remotely activated for the collection of video and audio data, there is an immediate increase in the consumption of the phone's system and energy resources. In addition, circumstances may exist in which the lost/stolen phone is being stored in a location which would not provide any meaningful audio or visual determinations as to its precise location (such as in a purse or the trunk of a car). As a result, the battery life of the cellular phone could run out before any meaningful data can ever be extracted. Therefore, it is important to minimize the consumption of the phone's system/energy resources by maximizing the opportunity of capturing a useful image and/or sound clip of the current user of the phone. It is important to note that although reference has been made to cellular phones, other types of wireless communication devices are contemplated, such as wireless notebook computers and personal digital assistants.

SUMMARY OF THE INVENTION

The present invention relates to a method for locating a wireless communication device (WCD). The method includes the step of receiving at the WCD a wireless transmission having a first auto-location trigger signal. Responsive to the first auto-location trigger signal, the WCD is operated in an auto-location mode.

The auto-location mode is selected to include the automatic collection and communication of predetermined data. The collection and communication steps can include communicating the predetermined data to a network server or any other device accessible via a computer network. The predetermined data is obtained at a location of the WCD. The data can include one or more elements selected from the group comprising video, audio, GPS data, base station location data, base station sector data, and signal strength data. As an alternative, the collected data is evaluated prior to its communication. For example, if the selected data is video data, the evaluation step automatically determines if the video data includes an image of a human face within the video data. Another example of the evaluation step can include automatically detecting the presence of one or more edges or objects in an image defined by the video data.

Once the automatic collection and communication of data is complete, the WCD enters a standby mode until a second auto-location trigger signal is received by the WCD. The second auto-location trigger includes a detected change in the state of the WCD. The detected change in state is exclusive of a wireless transmission comprising an auto-location trigger signal.

According to one aspect of the invention, the change in state is selected to include a change in a received RF signal strength data, a base station location data, a base station sector data, or a received GPS signal strength. According to another aspect of the invention, the change of state is a manipulation of the WCD. In this regard, the manipulation is selected to include one or more elements from the group comprising opening a cover of the WCD, grasping the WCD, activating an input key of the WCD, removing the WCD from a holster, removing the WCD from a case, and detecting a human pulse. Upon receiving the second auto-location trigger, the previous steps of automatically collecting and communicating the data are automatically repeated.

According to another embodiment of the invention, the invention relates to a wireless communications device (WCD). The WCD includes an antenna configured for receiving a wireless transmission comprising a first auto-location trigger signal. A central processing unit includes one or more components responsive to the first auto-location trigger signal for generating at least a first auto-location command signal for operating the WCD in an auto-location mode. One or more data collectors are provided with the WCD. The data collectors include one or more components capable of collecting physical data corresponding to a location of the WCD. The data collectors are responsive to the first auto-location command signal from the central processing unit for collecting at least a first data obtained at a location of the WCD. The WCD also includes a state detection device comprising at least one sensor responsive to a change in state of the wireless communications device exclusive of a wireless transmission comprising an auto-location trigger signal. Finally, the WCD includes one or more data collectors responsive to a second auto-location trigger signal. The data collectors responsive to a second auto-location trigger signal are used for collecting at least a second data obtained at the location of the WCD.

According to one aspect of the invention, the first and second data can include one or more of the following types of data: video data, audio data, GPS data, all tower location data, base station sector data and received RF signal strength data. The state detection device can be selected to detect one or more changes in state. The changes in state can be triggered by changes in data selected from the group comprising received RF signal strength data, base station location data, base station sector data, and received GPS signal strength. Other changes in state can be triggered by opening a cover of the WCD, grasping the WCD, activating an input key of the WCD, removing the WCD from a holster, removing the WCD from a case, and detecting a human pulse.

BRIEF DESCRIPTION OF THE DRAWINGS

Preferred embodiments of the present invention will be described below in more detail, with reference to the accompanying drawings, in which.

DETAILED DESCRIPTION

Embodiments of the present invention will now be described with respect to FIGS. 1-3B. Some embodiments of the present invention provide an improved method an apparatus for tracking a wireless communication device (WCD). More particularly, the present invention relates to a method and apparatus whereby a lost WCD can be located utilizing surreptitious triggers for the collection of data that could assist in identifying the location of the WCD.

Figure 1:
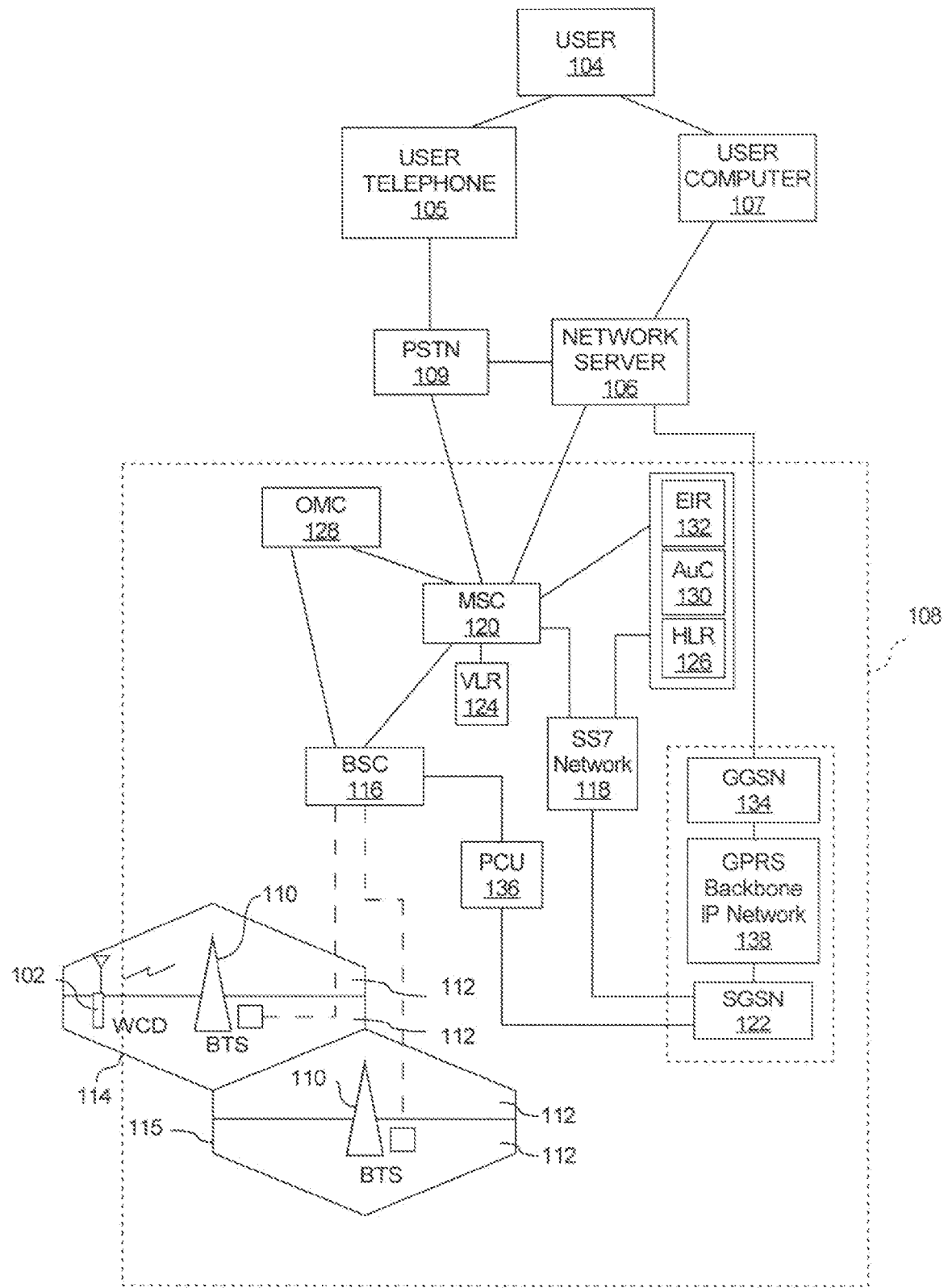
FIG. 1 is an overall representation of a wireless communication device infrastructure that is useful for understanding the invention.

Referring now to FIG. 1, there is provided an illustration of a wireless communications infrastructure 108 that is useful for understanding the invention. For convenience, the invention will be described in the context of a conventional GSM type wireless communication system. However, it should be understood that the invention is not limited in this regard. The invention can also be used with any other wireless communication infrastructure. Such wireless infrastructures can include other forms of wireless cellular communications systems, such as wireless LAN and WAN type networks.

The wireless communication infrastructure 108 can be defined by a collection of computer systems which are interconnected to facilitate the exchange of data between them. Portions of the wireless communication infrastructure 108 can be wired and/or wireless.

Wireless communication infrastructure 108 facilitates communications with a plurality of mobile subscribers who can communicate over an air/radio interface via their respective WCDs 102. The wireless communication infrastructure 108 can include four subnetworks: the radio network, the mobile switching network, the management network, and a core network.

The radio network can be comprised of a base station (BTS) 110 (commonly referred to as a base transceiver station) and a base station controller (BSC) 116. The cell 114 extends in a geographic area around the BTS 110. The BTS 110 provides the radio channels for signaling and user data traffic in the cell 114. The BTS 110 serves as the network portion of the air/radio interface. In addition to its data transmitting and receiving activities, the BTS 110 performs certain signal and protocol processes. For example, error protection coding is performed and LAPDm link level protocol for signaling is terminated at the BTS 110. However, the essential control and protocol intelligence entities reside in the BSC 116. The BSC 116 is responsible for executing handover protocols between various BTSs. The BSC 116 can also serve as a node for a SS7 network 118 connection to a mobile switching center (MSC) 120 and a supporting GPRS support node (SGSN) 122.

The mobile switching network can be comprised of the mobile switching centers (MSC) 120 and databases which store the data required for routing and service provision. The MSC 120 provides additional functions for location registration of subscribed WCD 102 and for the handover of a connection in case of changing from a first cell 114 to a second cell 115. The databases contained within the mobile switching network, can be divided into two main functional units: a visited location register (VLR) 124 and a home location register (HLR) 126. The VLR 124 stores the data of all WCDs 102 which are currently staying in the administrative area of the associated MSC 120. Although there is generally one VLR 124 for each MSC 120, a VLR can be responsible for the areas of one or more MSCs 120. The HLR 126 stores every subscriber and every mobile ISDN number pertaining to a WCD 102 that has their "home" in the respective network. The HLR is needed as the central register for routing to the subscribers, for which it has administrative responsibility. But, the HLR has no direct control over an MSC 120.

The management network is comprised of an operation and maintenance center (OMC) 128. The OMC 128 is responsible for initiating and monitoring network control functions such as: administrative and commercial operations; security management; network configuration, operation, and performance management; and maintenance tasks. The OMC 128 can perform these functions directly by communicating with a BSC 116 and/or MSC 120. The management network also includes additional databases responsible for various aspects of system security. Confidential data and keys are stored or generated in the authentication center (AuC) 130. The keys serve for user authentication and authorize the respective service access. The equipment identity register (EIR) 132 is responsible for storing the serial numbers supplied by the WCD manufacturer and registered by the network operator. The EIR 132 database facilitates the blockage of service access for WCDs 102 reported as stolen.

The GPRS core network provides mobility management, session management, and transport for Internet Protocol packet switched services in GSM networks. To facilitate the integration of GPRS into the GSM architecture, GPRS support nodes GSNs are implemented. These GSNs include serving GPRS support node (SGSN) 122 and gateway GPRS support node (GGSN) 134.

SGSN 122 delivers data packets to and from the WCDs 102 within its service area. The tasks of the SGSN 122 include packet routing and transfer, functions for attach/detach of WCDs and their authentication, and logical link management. The location register of the SGSN 122 stores location information and user profiles of all GPRS users registered with the particular SGSN 122. The SGSN 122 communicates with the BSC 116 through a packet control unit (PCU) 136. The PCU 136 performs many of the same tasks of the BSC 116, but only to the extent that the data concerns packet data. The GGSN 134 serves as an interface to external packet data networks, such as to the Internet, for several SGSNs 122. GGSN 134 provides the connectivity to the IP network 138 and the SGSN 122 and is responsible for IP address assignment.

Transmission and reception of data can occur between the wireless communication infrastructure 108 and the WCD 102. The BTS 110 is a radio receiver/transmitter that serves as the hub of a local wireless network. Moreover, the BTS 110 can serve as a gateway between a wired network and a wireless network. Typically, the BTS 110 will be responsible for transmitting and receiving data to/from a wireless communications device 102 located within its signal range. The area within signal range of the BTS 110 is known as a cell site 114. By using directional antennas on the BTS 110, each antenna pointing in different directions, it is possible to sectorize the base station so that several different cell sites 114 are served from the same location. Thus, the cell sites 114 can be further subdivided into separate regions, known as cell sectors 112.

Although the GSM model for cellular systems has been used as an example to describe the wireless communication infrastructure 108, a person skilled in the art will appreciate that the wireless communication infrastructure 108 can be modeled after other types of communications network architecture. According to another embodiment of the invention, the network server 106 may communicate with a WCD 102 that is exclusive of a cellular phone (such as a notebook or PDA) via a local area network (wireless LAN) or a wireless wide access network (wireless WAN).

Referring again to FIG. 1, it can be observed that a user can communicate with mobile subscribers possessing a WCD 102. In particular, a user 104 can communicate with the WCD 102 by accessing the wireless communication infrastructure 108. For example, such access can be provided by a user using a conventional telephone 105 to communicate with the wireless communication infrastructure 108 using a conventional public switched telephone network (PSTN) 109.

The inventive arrangements can also include a network server 106 which communicates with one or more computers comprising the wireless communication infrastructure 108. The operation of the network server in conjunction with the wireless communication infrastructure is described in relation to FIG. 3.

Figure 2:
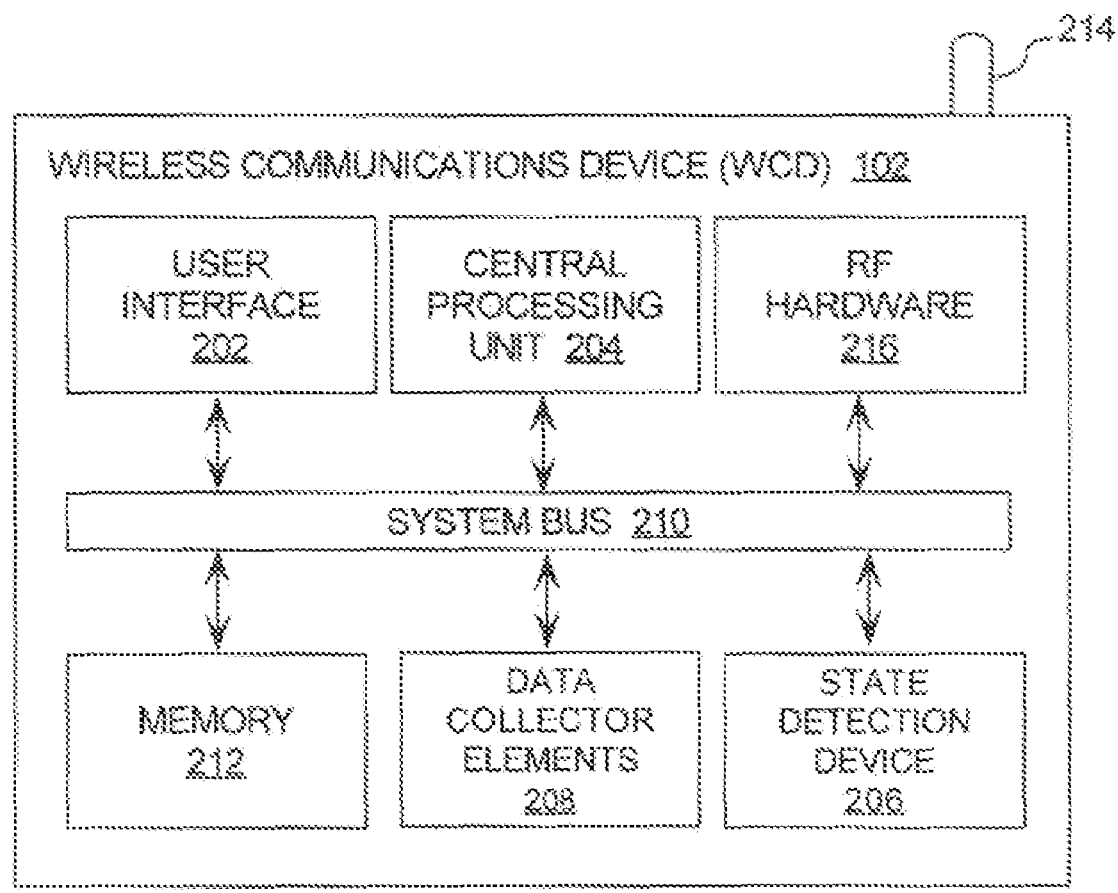
FIG. 2 is a block illustration of a wireless communications device architecture that is useful for understanding the invention.

Referring now to FIG. 2, there is provided a simplified block diagram for a WCD 102 that is useful for understanding the present invention. The WCD 102 is comprised of a user interface 202, a central processing unit 204, a state detection device 206, a data collector 208, a system bus 210, and a memory 212. The memory is connected to and accessible by other portions of the WCD 102 through the system bus 210.

The WCD 102 is also comprised of a radio frequency (RF) antenna 214 and radio frequency (RF) hardware 216. The RF antenna 214 and the RF hardware 216 will not be described in detail herein. However, it should be understood that the RF antenna 214 and the RF hardware 216 enable communications between the lost WCD 102 and an external device (such as a network server 106 shown in FIG. 1).

At least some of the data collector elements 208, state detection device 206, and central processing unit 204 perform actions involving access to and use of the memory 212. The memory 212 may be a random access memory (RAM), a read only memory (ROM), a flash memory, a memory card, and/or a built-in hard disk. The central processing unit 204 may include microprocessors, application specific integrated circuits (ASICs), and other hardware. The data collector elements 208 can include audio detection and coding apparatus, video detection and coding apparatus, and a GPS receiver. The user interface 202 is comprised of input devices, output devices, and software routines configured to allow a WCD user 104 to interact with and control the data collector elements 208 and software applications installed on the WCD 102.

A person skilled in the art will appreciate that the WCD's system architecture is one embodiment of a system architecture in which the method described below can be implemented. The invention is not limited in this regard and any system architecture can be used without limitation. For example, the architecture of the WCD 102 can be consistent with a conventional mobile cellular telephone, wireless PDA or any other computer system that communicates with a wireless network.

In addition portions of the present invention can take the form of a computer program product on a computer-usable storage medium having computer-usable program code embodied in a data storage medium. The term computer program product, as used herein, refers to a device comprised of all the features enabling the implementation of the methods described herein, and which, when loaded in a computer system, is able to carry out these methods. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

Figure 3A:
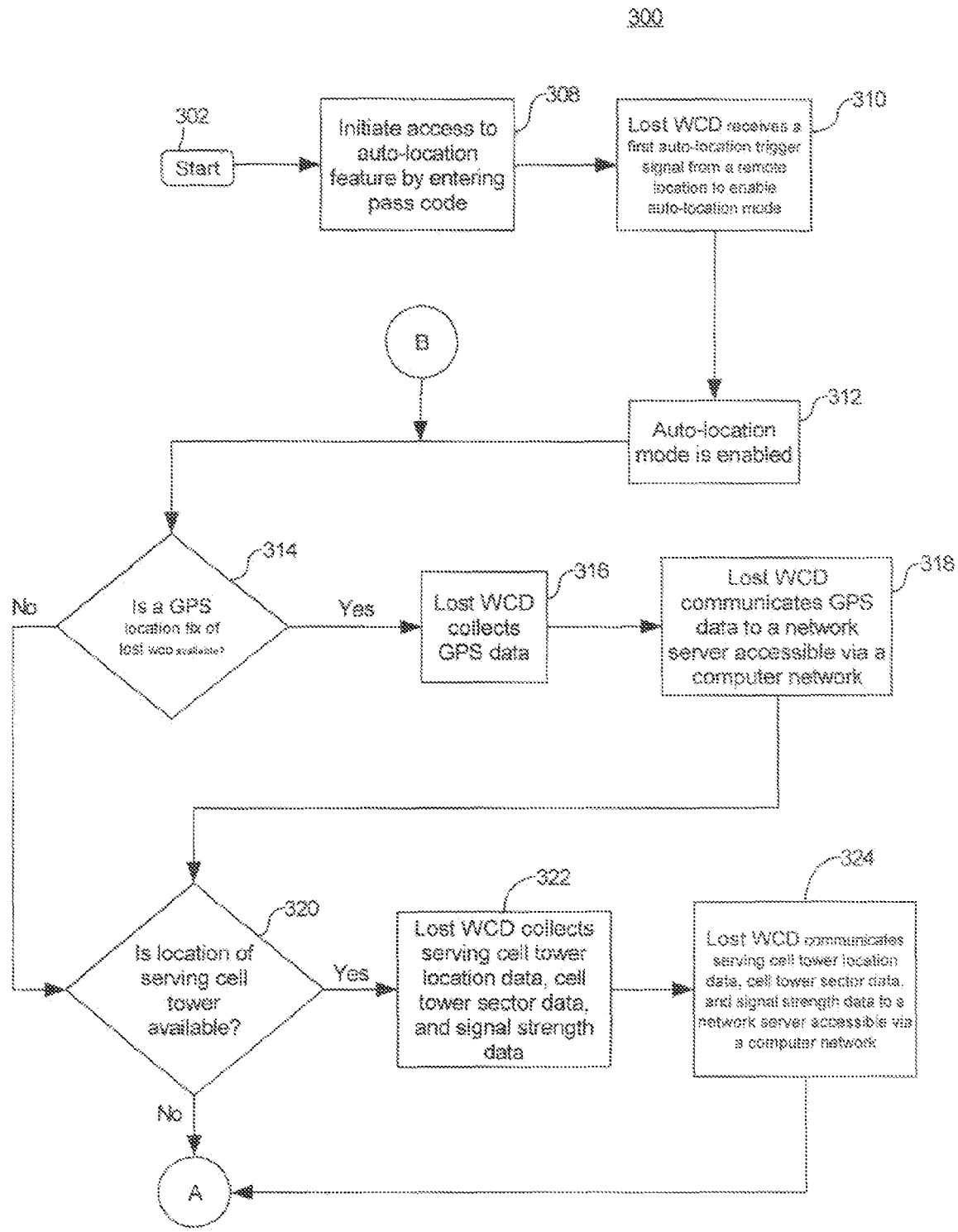
FIGS. 3A and 3B collectively illustrate a schematic flow diagram of a method for locating a wireless communications device, which is useful for understanding the invention.
Figure 3B:
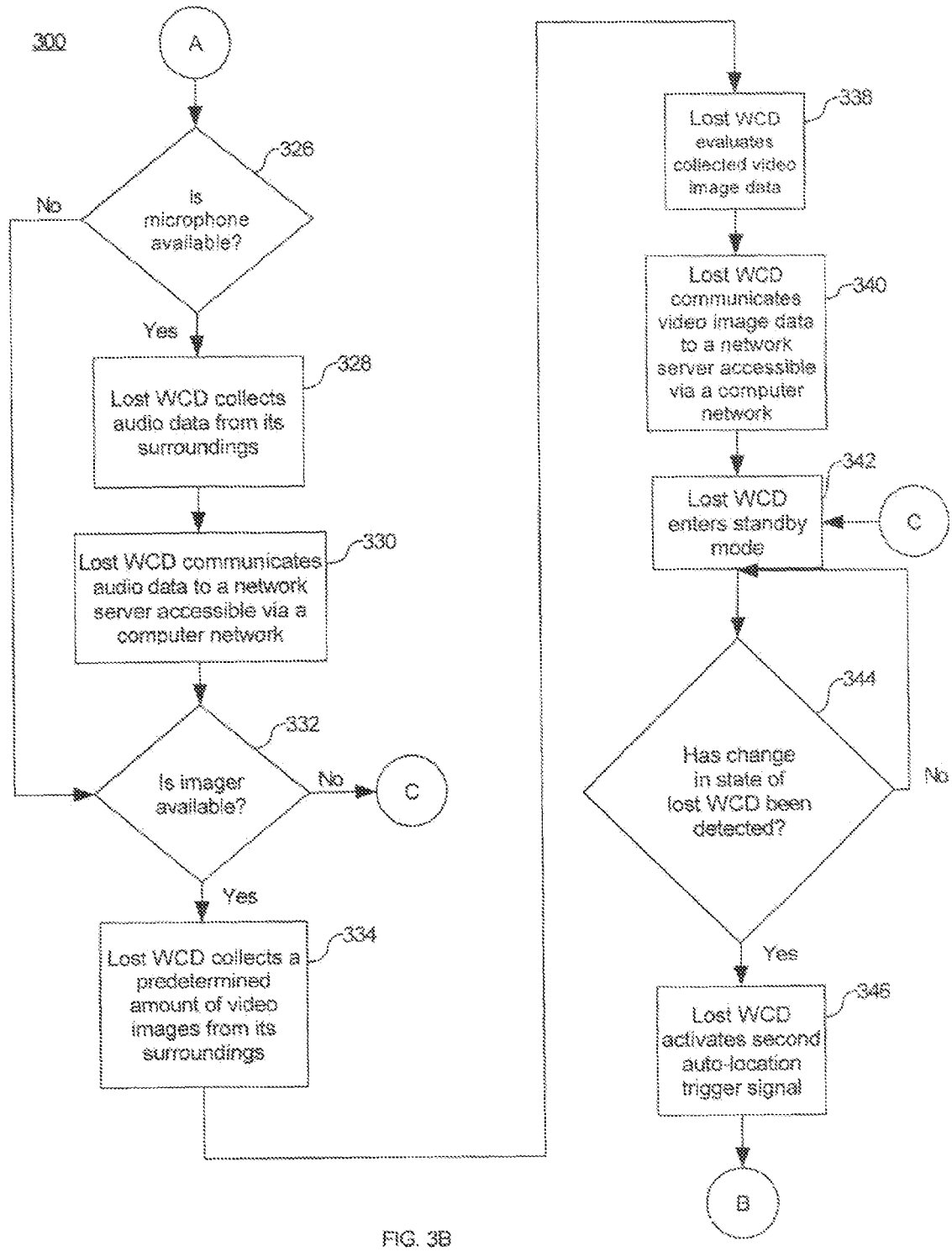

The following FIGS. 3A and 3B, and accompanying text illustrate a method 300 for locating a WCD in accordance with the present invention. It should be appreciated, however, that the method is not limited solely to the method shown.

Referring now to FIG. 3A, the method 300 begins at step 302 and continues with step 308. When a WCD 102 is lost or stolen, its owner or a user 104 can in step 308 initiate access to the auto-location feature of the WCD 102 using the network server 106. According to one embodiment of the invention, the WCD user 102 initiates access to the auto-location feature by entering a password code. The entry of a password code can be required to prevent unauthorized persons from gaining access to private and/or otherwise sensitive information about the WCD's (and perhaps, the WCD owner's) location. However, it should be recognized that the invention is not limited in this regard. Other authorized persons, such as those in law enforcement, may initiate access to the auto-location feature without the use of a pass code. This can be achieved by overriding pass code access to the network server 106.

The network server 106 waits for requests for services from a user 104 and/or other computers forming part of a wireless communication infrastructure 108. The network server 106 controls network traffic and access to the wireless communication infrastructure 108. Communication between the user 104 and the network server 106 can be established via a conventional telecommunication system. In this regard, a user 104 can access the network server 106 by dialing into the network server 106 using the user telephone 105. According to another embodiment, the user 104 may connect to the network server 106 via worldwide computer network using a user computer 107.

Once the user 104 has successfully gained access to the network server 106, the user 104 will have control access to the auto-location feature of the lost WCD 102. As noted above, such control access can be limited by any suitable means, such as by use of biometric data, a pass code or other secret data. Communication between the user 104 and the server 106 can be performed by any suitable means. For example, such communications can include using a keypad on a user telephone 105, voice commands, and/or by keystrokes input into a keyboard interface of user computer 107.

After control access to the network server 106 has been achieved, a user 104 can communicate with the server 106 a command signal to initiate a WCD auto-location process. Once such autolocation process is initiated, the server 106 can begin a series of steps intended to help the user locate the WCD and/or identify a person who has stolen such device. In step 310, the server 106 can communicate with one or more computers associated with the wireless communication infrastructure 108 to cause the WCD to enter an auto-location mode of operation. This auto-location mode can be initiated by a first auto-location trigger signal communicated to the WCD 102. The auto-location trigger signal advantageously includes one or more data fields that contain information specifically identifying the particular WCD 102 which is intended to receive the auto-location trigger signal. Such information can include one or more of the following items without limitation: and ISDN number, a device serial number, a telephone number, and a subscriber identity module (SIM) identifier. Of course, other methods of identifying the WCD 102 are known in the art and the invention is not intended to be limited to these particular methods. All that is necessary is that the auto-location trigger signal provides sufficient information to the wireless communication infrastructure 108 so that the particular WCD 102 which is lost or stolen can be identified.

The auto-location trigger signal can be communicated to the WCD 102 by any suitable method known in the art. According to one embodiment, the auto-location trigger signal can be communicated to the WCD as a result of a signal communicated from the network server 106 to one or more computers associated with the wireless communication infrastructure. For example, in response to a signal received from the network server 106, the wireless communication infrastructure can cause an auto-location trigger signal to be communicated from a BTS 110 to the WCD 102. The particular signaling used to communicate the auto-location trigger is not critical, provided that the signal is detected and decoded by the WCD. In this regard, it should be understood that such auto-location trigger signal can be communicated to the WCD 102 regardless of whether such WCD 102 is actively being used for a telecommunications session.

Communication of the first auto-location trigger signal can be controlled by the OMC 128, the MSC 120, or via packet data to the GGSN 134 (if GPRS core network is implemented). The first auto-location trigger signal would then be routed through the various computer systems forming the wireless communication infrastructure 108 (discussed earlier in FIG. 2). Within the wireless communication infrastructure 108, the base station 110 will then relay the first auto-location trigger signal to the lost/stolen WCD 102, enabling the auto-location mode of the WCD 102. The WCD 102 would typically be located within the particular cell sector 112 of the cell 114 serviced by the BTS 110.

In step 310, the lost WCD 102 receives a first auto-location trigger signal from a remote location to enable its auto-location mode. This first auto-location trigger signal can be in the form of packet data communicated via the wireless communication infrastructure 108 to a base station 110. The base station 110, in turn, transmits the first auto-location trigger signal to the RF antenna 214 of the lost WCD 102. The first auto-location trigger signal is not limited to packet stream data, as other forms of data may be used. Moreover, other signal routes of the first auto-location trigger signal are possible.

Once the first auto-location trigger is received by the lost WCD 102, the auto-location mode is enabled, according to step 312. The auto-location mode of the WCD 102 is enabled by the central processing unit 204, which is responsive to the first auto-location trigger signal. The central processing unit, upon receiving the first auto-location trigger signal, generates one or more auto-location command signals which enable the auto-location mode in the WCD 102.

As part of the auto-location mode, the central processing unit 204 can evaluate whether a GPS (Global Positioning System) location fix of the lost WCD 102 is available, as shown in step 314. If a GPS location fix of the lost WCD 102 is available, the central processing unit 204 executes a command signal to collect GPS data, as shown in step 316. Subsequent to step 316, the lost WCD 102 communicates the GPS data to the network server 106 accessible via a wireless communication infrastructure 108 in step 318. Alternatively, the GPS data can be temporarily stored in a memory 212 and communicated to the network server 106 together with additional data as described below. If a GPS location fix of the lost WCD 102 is not available, the central processing unit 204 then evaluates in step 320 whether the location of the lost WCD's serving base station is available. If the location of the lost WCD's serving base station is available, the central processing unit 204 executes a command signal to collect, via data collector elements 208, serving base station location data, base station sector data, and signal strength data, as shown in step 322. Subsequent to step 322, the lost WCD 102 communicates the serving cell location data, base station sector data, and signal strength data to a network server 106 accessible via a wireless communication infrastructure 108 in step 324.

Those skilled in the art will appreciate that in certain wireless communication infrastructures, the serving base station location data, base station sector data, and signal strength data may be available at the BTS 110 and/or at BSC 116. Accordingly, an alternative embodiment of the invention can include communicating such data to the network server 106 in response to the auto-location trigger signal. If the location of the serving base station is not available or if the communication of the aforementioned data from step 324 is effectuated, the method continues on to step 326.

Referring now to FIG. 3B, the method continues with step 326. In step 326, a determination is made whether the lost WCD 102 contains hardware and/or software components suitable for collecting and communicating audio data. Such components will exist in a mobile cellular phone, and may be present in other types of WCDs. If the WCD does include such components for collecting and communicating audio data, then, the central processing unit 204 will control the operation of the WCD 102 to cause the collection of audio data from its surrounding location, as shown in step 328. In step 330, the lost WCD 102 communicates the collected audio data to a network server accessible via a wireless communication infrastructure 108. Alternatively, the audio data can be temporarily stored in a memory 212 and can be communicated together with other data as described below.

If the WCD 102 does not include suitable components for collecting and transmitting audio data, or if the audio data has been communicated to a network server, the method continues to step 332. In step 332, a determination is made as to whether the WCD 102 has imaging components which provide the ability to collect and transmit image data. If such components are available, the central processing unit 204 can communicate a command signal to activate the imaging components. In response to the command signal, the imaging components will be activated, and the WCD 102 will collect a predetermined amount of video image data from its surrounding location, as shown in step 334. The imaging components can collect still images or motion video.

The collection of image data can also include an optional step 338. After the lost WCD 102 has collected the predetermined amount of video images, the central processing unit 204 of the WCD 102 evaluates the collected video image data in step 338. In particular, the central processing unit 204 automatically evaluates whether the video image data includes an image of a human face within the video image data. In addition or in the alternative, the central processing unit 204 can also automatically detect the presence of one or more edges or objects in an image defined by the video image data. Image recognition algorithms can be executed to facilitate this evaluation step. Such image recognition algorithms are generally known in the art.

By determining whether an actual human face or object can be discerned from a video image, the lost WCD 102 can determine whether it has collected useful image data that should be communicated to the network server 106. Such image evaluation process can also conserve memory space by retaining only video image data that is useful for facilitating the location of the lost WCD 102 and/or the identity of the person using the lost WCD 102.

Once it has been determined that useful video image data has been collected by the image, the method continues with step 340 whereby the lost WCD 102 communicates the video image data to a network server accessible via a wireless communication infrastructure 108. If there is any other data which has been collected and stored in memory 212 in previous steps described herein, then such data can also be communicated to the network server 106 at this time. If the WCD 102 does not include imaging capabilities or if the communication of collected data is completed, then the WCD 102 enters a standby mode, as shown in step 342.

Those skilled in the art will appreciate that the data collected by the lost WCD 102 in steps 314 to 342 may or may not be useful for the purposes of location the WCD 102 and/or identifying the person in possession of the WCD 102. For example, the WCD 102 could be stored in a location where the audio data is muffled or unintelligible, and its position could be such that the imaging components cannot collect useful image data. Similarly, the WCD 102 may be stored in a location where GPS data cannot be received. Accordingly, it can be advantageous for the WCD 102 to detect any changes in the state of the device which may indicate a new opportunity to collect useful data. The lost WCD 102 remains in standby mode until some predefined event occurs which is indicates a change in the state of the WCD.

As noted above, a change in the state of the WCD 102 includes any occurrence that can be useful for indicating that the WCD 102 should repeat the data collection process previously described in relation to steps 314 through 342. For example, if the WCD 102 detects that it has been manipulated, or its position has changed, this could be interpreted as a change in state. There are various ways to manipulate a lost WCD 102 that would produce a change in its state. For example, one way is by opening a cover of the lost WCD 102. Specifically, this cover can include the protective lid equipped on some personal digital assistants, as well as the monitor portion of a flip-phone or notebook computer. Another way to manipulate a lost WCD 102 can include the activation of an input key on the lost WCD 102. Examples include, but are not limited to (1) depressing the 'Talk', 'Send', 'PTT', or number pad on a cellular phone, and (2) depressing a keypad or push-screen on a PDA or notebook computer. A detected manipulation of the device can be particularly useful because it can signal an opportunity to capture an image of a person's face and/or a surrounding location when the WCD 102 is being used.

Another way to manipulate the lost WCD 102 to produce a change in its state includes the removal of the lost WCD 102 from its holster. For example, when the WCD 102 is attached to the holster, this action can close an electromagnetic circuit. However, when the WCD 102 is disconnected from its holster, the electromagnetic circuit opens, thus triggering a change in state. In addition, the use of biometric data can be used to manipulate the lost WCD 102, such as the detection of a human pulse when the lost WCD 102 is grasped by a person. Finally, other detectable changes in the state of the lost WCD 102 include, but are not limited to, changes in a received signal strength data, a base station location data, a base station sector data, a received GPS location data, and a received GPS signal strength. Such changes in state would indicate that the lost WCD 102 is being moved from one location to another.

From the foregoing, it will be appreciated that the state detection device 206 included in the WCD 102 can include one or more existing components, such as sensors, or systems included in the device. For example, the state detection device can be an input key, a user interface button, a position sensor for a cover, a holster sensor for determining if the WCD is in or out of a holster, a GPS receiver, a wireless communication receiving device, and so one. Any of these devices can be defined as state detection devices 206. The central processing unit 204 can monitor one or more of these device components to determine when a change in state has occurred.

Thus, a determination is made as to whether a change in state has occurred with respect to the WCD 102 in step 344. If a change in the lost WCD state is produced, central processing unit will activate a second auto-location trigger signal, shown in step 346. The second auto-location trigger signal can be selected to cause the WCD 102 to return to step 314 and thereafter repeat one or more of the data collection and transmission steps described above in relation to steps 314 through 342. This process of entering a standby mode until detecting a change of state allows the WCD 102 to minimize any unwanted expenditure of system and energy. In particular, the WCD 102 can conserve its power resources by reserving any subsequent collection and transmission steps to those instances when the WCD 102 is most likely to produce meaningful or useful data regarding its surroundings and its current user.

Collectively, at least one of the serving base station location data, base station sector data, signal strength data, audio data, and video data defines the first data that is collected by the WCD 102. Temporally speaking, the first data is that data which is collected by the data collector element(s) 208 prior to any change in state by the WCD 102. After a change in state has been produced, the data collected by the data collector element(s) 208 would be defined as second data. However, it will be appreciated that the precise order in which data is collected and/or transmitted is not critical.

Once the various types of data has been collected and transmitted to the server 106, it can be stored in a data store for subsequent access and evaluation. For example, the information can be accessed by a user, law enforcement, or telephone system personnel for the purposes of locating the lost WCD. A user can make use of a user computer 107 to access server 106 by means of a worldwide computer network, such as the internet. After again providing any necessary password code or security information, the user can access the stored data that has been collected. The data can then be used to help locate the telephone.

It should be also appreciated that above described method 300 for locating a lost WCD 102 can be implemented in computer program code. In such a scenario, the computer program code for carrying out the routines and functions of the present invention can be written in an object orientated programming language such as Java®, Smalltalk, C++, or Visual Basic®. However, the computer program code for carrying out the routines and functions of the present invention can also be written in conventional procedural programming languages, such as "C" programming language.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit, and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope, and concept of the invention as defined.

The invention claimed is:

1. A method for collecting data for purposes of recovering a lost wireless communications device, comprising:
   receiving at said lost wireless communications device a wireless transmission comprising a first trigger signal;
   responsive to said first trigger signal, operating said lost wireless communications device in an auto-location mode;
   selecting said auto-location mode to include
   automatically collecting audio and video data obtained at a location of said lost wireless communications device;
   automatically evaluating said video data, for the purpose of recovering the lost wireless communications device, when a GPS location fix or location of cell tower is detected as unavailable by the lost wireless communications device;
   automatically communicating said audio and video data in response to evaluation of the video data;
   entering a standby mode after said automatically collecting and communicating step, and
   repeating said automatically collecting and communicating step responsive to a second trigger signal, said second trigger signal comprising a detected change in state of said lost wireless communications device exclusive of a wireless transmission comprising said first trigger signal; said change in state is a manipulation of said lost wireless communications device, and is selected from a group consisting of: opening a cover of said lost wireless communications device, grasping said lost wireless communications device, and detecting a human pulse.

2. The method according to claim 1, further comprising selecting said data to include video data, and selecting said automatically evaluating step to include automatically determining if said video data includes an image of a human face within said video data.

3. The method according to claim 1, further comprising selecting said data to include video data, and selecting said automatically evaluating step to include automatically detecting the presence of one or more edges or objects in an image defined by said video data.

4. The method according to claim 1, further wherein said manipulation is selected to include activating an input key of said wireless communications device.

5. The method according to claim 1, wherein said change of state is selected to include a change in a signal strength data, a base station location data, a base station sector data, or a received GPS signal strength.

6. The method according to claim 1, further comprising selecting said collecting and communicating step to include communicating said data to a network server accessible via a computer network.

7. The method according to claim 1, further comprising selecting said first auto-location trigger signal to include a communications initiated by a telephone handset.

8. The method according to claim 7, wherein said communications initiated by said telephone handset includes at least one user password code which is required to enable said auto-location mode.

9. A wireless communications device (WCD) configurable to be recovered when lost, comprising:
   an antenna configured for receiving a wireless transmission comprising a first trigger signal;
   a central processing unit comprising one or more components responsive to said first trigger signal for generating at least a first auto-location command signal for operating said lost wireless communications device in an auto-location mode;
   at least one data collector comprising one or more components capable of collecting audio and video data corresponding to a location of said lost WCD responsive to said first auto-location command signal from said central processing unit for collecting at least video data obtained at a location of said wireless communications device;
   wherein said central processing unit is configured for evaluating video data and
   wherein said central processing unit is configured to direct communication of said audio and video data in response to evaluation of the video data;
   a state detection device comprising at least one sensor responsive to a change in state of said wireless communications device exclusive of a wireless transmission comprising an trigger signal; said change in state is a manipulation of said wireless communications device, and is selected from a group consisting of: opening a cover of said wireless communications device, grasping said wireless communications device, and detecting a human pulse; and
   said at least one data collector responsive to said second trigger signal for collecting at least a second data obtained at said location.

10. The wireless communications device according to claim 9, wherein said central processing unit is configured for automatically determining if said video data includes an image of a human face within said video data.

11. The wireless communications device according to claim 9, wherein said central processing unit is configured for automatically detecting the presence of one or more edges or objects in an image defined by said video data.

12. The wireless communications device according to claim 9, further wherein said manipulation is selected to include activating an input key of said wireless communications device.

13. The wireless communications device according to claim 9, wherein said change of state is selected to include a change in a signal strength data, a base station location data, a base station sector data, or a received GPS signal strength.

* * * * *